United States Patent
Neilson

[11] 3,897,087
[45] July 29, 1975

[54] METHOD OF FASTENING APPARATUS ELEMENTS

[75] Inventor: David Neilson, Skelmorlie, Scotland

[73] Assignee: Imperial Chemical Industries Limited, London, England

[22] Filed: Aug. 13, 1973

[21] Appl. No.: 387,728

[30] Foreign Application Priority Data
Sept. 1, 1972   United Kingdom............... 40674/72

[52] U.S. Cl. ...................... 285/18; 29/426; 52/232; 52/758 F; 85/50 R; 285/363
[51] Int. Cl.² .......................................... F16L 35/00
[58] Field of Search ............. 285/21, 287, 363, 286, 285/405, 368, DIG. 18, 412, 22, 18, 23; 277/1, 95, 236; 85/50 R; 29/470.5, 470.7, 493, 501, 426; 403/2, 11, 28, 32, 337; 52/232, 758 F; 137/72; 169/42; 49/1

[56] References Cited
UNITED STATES PATENTS

| | | | |
|---|---|---|---|
| 56,326 | 7/1866 | Paterson ......................... | 285/363 X |
| 1,074,187 | 9/1913 | McCloud ................................. | 49/1 |
| 1,151,289 | 8/1915 | Saino ..................................... | 52/232 |
| 1,891,183 | 12/1932 | Rowley ............................. | 137/72 X |
| 1,953,582 | 4/1934 | Belknap .............................. | 169/42 |
| 2,065,480 | 12/1936 | Soper................................... | 29/470.7 |
| 3,167,320 | 1/1965 | Kyle................................. | 277/236 X |

FOREIGN PATENTS OR APPLICATIONS
40,405   6/1962   Germany............................ 85/50 R

*Primary Examiner*—Dave W. Arola
*Attorney, Agent, or Firm*—Cushman, Darby & Cushman

[57] ABSTRACT

Method of fastening apparatus elements, especially apparatus for explosives manufacture, in which the elements are clamped together with one or more low temperature fusible packing elements, for example elements fabricated from a fusible alloy.

10 Claims, 7 Drawing Figures

METHOD OF FASTENING APPARATUS ELEMENTS

This invention relates to the fastening by clamping together of apparatus elements whereby the clamping pressure may be readily released without the use of mechanical tools. The invention is especially useful for the assembly of apparatus for use with explosive material. The invention also includes packing elements for the said fastening method and apparatus, and the assembly thereof using the said fastening method.

In the manufacture and handling of explosives and other hazardous materials, such as inflammable liquids and gases which are liable to ignition from sparks or by the friction or impact of relatively moving materials, the dismantling of apparatus constitutes a major hazard. For example, if the bolts or flanges in pipework or reaction vessels are contaminated with explosives or inflammable liquids, the hand tools used to slacken the nuts can generate sparks or hot spots and cause ignitions. In some cases involving sensitive explosive materials which are difficult to remove by established decontamination techniques, remote dismantling methods have been developed. These methods involve expensive tools and are even more likely to cause ignitions with subsequent damage to plant (although not to personnel) than the use of hand tools.

It is an object of this invention to provide a method of fastening elements of apparatus together which can be readily dismantled without the necessity of mechanical tools to release the tension on fixing bolts.

In accordance with this invention a method of fastening two or more apparatus elements comprises clamping the said apparatus elements together with one or more low temperature fusible packing elements so that the clamping pressure on any of the said elements may be released by fusing the, or each, packing element. When the fusible packing element is fused to release the clamping pressure, the apparatus elements may be readily separated.

The method is especially useful for fastening two or more elements which are liable to become contaminated in use with heat or shock ignitable material, the elements being fusible at a temperature below the decomposition temperature of the said sensitive material.

The two apparatus elements may, for example, be provided with flanges and clamped by bolting the flanges together, the fusible packing element being provided as a gasket between the flanges or as washers on the bolts. In this method the bolts are preferably located in open slots in the flanges so that they may be completely removed when the fusible element melts without removing the nuts.

The fusible packing element should preferably be fusible at a temperature below 150°C and more preferably it should be fusible at a temperature below 100°C so that it can be fused by boiling water or steam at normal pressure. The fusion temperature should obviously be above the maximum temperature which the apparatus will reach in normal use.

The packing element is conveniently fabricated from a low temperature fusible alloy such as one of the well known fusible bismuth alloys. An especially suitable alloy for this purpose is the eutectic alloy of bismuth, lead, tin and cadmium, fusible at 70°C which is commercially available under the trade name "Cerrobend" (Registered Trade Mark) from Mining and Chemical Products Limited. This alloy has the property of increasing the clamping pressure on standing.

From another aspect, the invention consists in a low temperature fusible packing element such as a gasket or washer for packing a clamped joint between apparatus elements.

The invention also includes an apparatus assembly which can be readily dismantled, wherein at least some of the apparatus elements are connected by clamped joints comprising one or more low temperature fusible packing elements.

From a still further aspect the invention includes a method of assembling apparatus suitable for use with explosive or inflammable materials in which method at least part of the apparatus elements are connected by a clamped joint wherein a low temperature fusible packing element is clamped with the apparatus elements, whereby the clamping pressure on the joint may be readily released by heating and fusing the packing element.

When the packing elements and methods of the invention are used for the assembly of pipework and reaction vessels for the manufacture of explosives or other hazardous chemicals the apparatus can be readily dismantled by fusing the packing elements without the need for unscrewing bolts.

In order further to illustrate the invention the assembly of flanged pipe joints will now be described by way of example only with reference to the accompanying drawings wherein, FIG. 1 shows a joint in sectional elevation FIG. 2 is a section on the line II—II of FIG. 1

In the drawings, like parts are represented by the same numerals.

Figure 1:
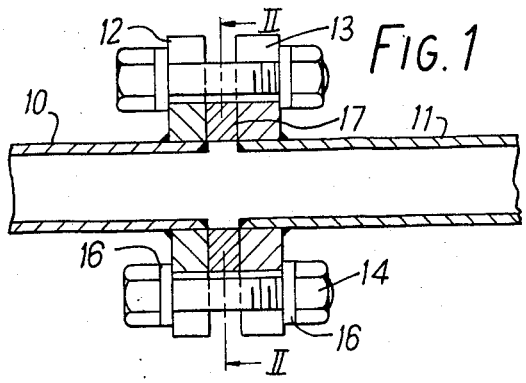
Figure 2:
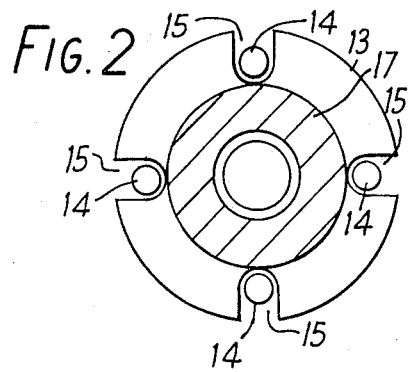

In the joint shown in FIGS. 1 and 2 pipe sections 10 and 11 have flanges 12 and 13. Four bolts 14 are accommodated in open slots 15 in the flanges 12, 13. The bolts are provided with conventional metal washers 16. A gasket 17 of "Cerrobend" fusible alloy is located between the flanges and the flanged joint is tightly clamped by the bolts 14.

The clamping pressure is maintained indefinitely, or may increase slightly on standing. The joint may be readily dismantled by heating the gasket 17 above 70°C, for example by hot water or steam, whereupon the alloy gasket 17 fuses and runs out of the joint, the tension on the bolts 14 is released and the bolts may be removed from the slots 15. The alloy may be collected, quickly chilled to solidify it and re-used in further packing elements.

Figure 3:
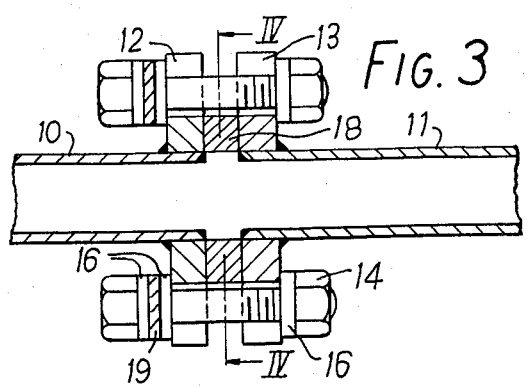
FIG. 3 shows in sectional elevation a modification of the joint of FIG. 1
Figure 4:
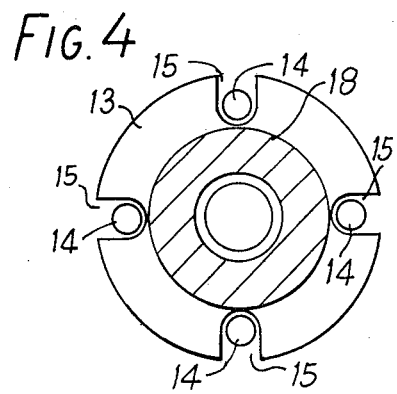
FIG. 4 shows a section on the line IV—IV of FIG. 3

In the joints shown in FIGS. 3 and 4 a conventional gasket 18, for example a fibre gasket, is used and a washer 19 of Cerrobend fusible alloy sandwiched between two conventional metal washers 16 is used on each bolt. The joint is tightly clamped by the bolts 14 but may be readily dismantled by heating the washers 18 above 70°C.

Figure 5:
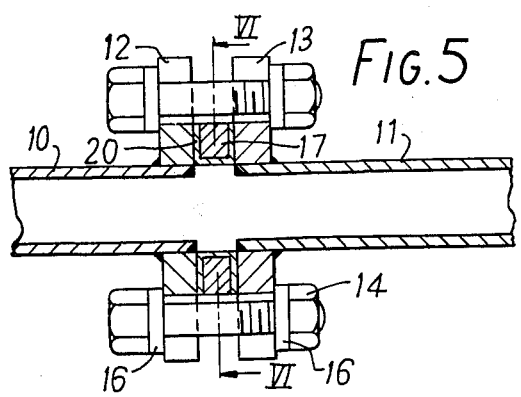
FIG. 5 shows in sectional elevation a further modification of the joint of FIG. 1
Figure 6:
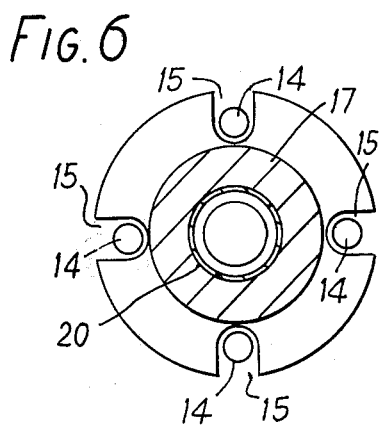
FIG. 6 shows a section on the line VI—VI of FIG. 5

In the joints shown in FIGS. 5 and 6 the Cerrobend fusible alloy gasket 17 is encased in an envelope 20 of synthetic plastics material, for example polytetrafluorethylene, to protect the gasket from corrosive chemicals. As shown the outside edge of gasket 17 is uncovered but, if desired, the gasket may be completely enclosed and thereby protected from atmospheric corrosion. The gasket 17 can be readily melted to relieve the clamping pressure on the joint.

Figure 7:
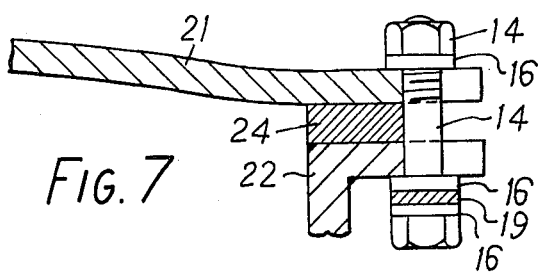
FIG. 7 shows a fragmentary section of a flanged joint of a lid on a reaction vessel.

The reaction vessel of FIG. 7 has a lid 21 flanged to a vessel wall 22 clamped by bolts 14, located in open slots in the flanges. A conventional gasket 24 is clamped in the joint and a washer 19 of Cerrobend fusible alloy is used on each bolt as in the joint of FIG. 3. The bolts 14 may be removed by melting the washers 19, and withdrawing the bolts from the slots.

what we claim is:

1. In a method of assembling and dismantling a joint of the kind in which at least two apparatus elements are drawn toward each other and held in fixed relative positions by at least one clamping device which applies clamping forces to said apparatus elements and which is held in its operative position with respect to said apparatus elements solely by said clamping forces, the steps of providing in said joint at least one metal element fusible below 150°C through which the clamping device transmits the clamping pressure required to hold said clamping device in its operative position relative to said apparatus elements, subsequently heating and melting said fusible metal element to thereby relieve said apparatus elements and said clamping device of the clamping pressure, and then removing the clamping device without any relative movement between any parts of said clamping device so as to permit separation of the apparatus elements from each other.

2. A method as in claim 1 wherein each said apparatus elements includes a flange having slots with open ends at an edge of the flange, wherein said clamping device includes a nut and a bolt disposed in the slots in said flanges, and wherein said fusible element is a gasket disposed between the flanges, said gasket being constructed and arranged to permit removal of said clamping device through the open ends of said slots.

3. A method as in claim 1 wherein each said apparatus elements includes a flange having a slot with an open end at an edge of the flange, wherein said clamping device includes a nut and a bolt disposed in the slots in said flanges, and wherein said fusible element is a washer carried on said bolt.

4. A method as in claim 1 wherein said fusible element is fusible below 100°C.

5. A clamped joint comprising at least two apparatus elements each having slots with open ends disposed at an edge of the element, said elements being clamped and held in fixed relative positions by at least one fastening device which is disposed in the slots in apparatus elements and which is separable from said apparatus elements through said open end of said slots and which applies clamping forces to said apparatus elements and which is held in its operative position with respect to said apparatus elements solely by said clamping forces, at least one metal element which is fusible below 150°C in said joint through which the clamping device transmits the clamping pressure required to hold said clamping device in its operative position relative to said apparatus elements, whereby upon subsequently heating and melting said fusible metal element the clamping pressure is relieved from said apparatus elements and from said clamping device so that the latter may be separated from said apparatus elements through said open end of said slots.

6. A joint as in claim 5 wherein each of said apparatus elements includes a flange in which is provided the respective open end slot and wherein said fastening device is a nut and bolt.

7. A clamped joint as in claim 6 wherein said fusible element is a gasket between said flanges, said gasket being constructed and arranged to permit removal of said clamping device through the open ends of said slots.

8. A clamped joint as in claim 6 wherein said fusible element is a washer carried on said bolt.

9. A clamped joint as in claim 5 wherein said fusible element is fusible below 100°C.

10. In a method of assembling and disassembling an apparatus contaminated with explosive material the steps of forming a joint between at least two parts of said apparatus by clamping said parts in fixed relationship to each other by means of at least one clamping device which is held in its operative position solely by the clamping forces produced by said device, disposing at least one metal element which is fusible below 150°C in said joint in a position in which said fusible metal element transmits the clamping pressure required to hold said clamping device in its operative position relative to said parts, and subsequently heating and melting said fusible metal element to thereby relieve said parts and said fastening device of the clamping pressure, and then removing the clamping device without any relative movement between any parts of said clamping device so as to permit separation of the apparatus elements from each other.

* * * * *